(12) United States Patent
Ames

(10) Patent No.: US 9,698,844 B2
(45) Date of Patent: *Jul. 4, 2017

(54) SIGNAL PATH PROCESSING BIAS ERROR DETECTOR

(71) Applicant: Blue Line Engineering Company, Colorado Springs, CO (US)

(72) Inventor: Gregory Ames, Colorado Springs, CO (US)

(73) Assignee: Blue Line Engineering Company, Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,719

(22) Filed: Jan. 29, 2016

(65) Prior Publication Data

US 2016/0233907 A1 Aug. 11, 2016

Related U.S. Application Data

(63) Continuation of application No. 14/602,973, filed on Jan. 22, 2015, now Pat. No. 9,281,854.

(60) Provisional application No. 61/930,397, filed on Jan. 22, 2014.

(51) Int. Cl.
*H04B 17/00* (2015.01)
*H04B 1/16* (2006.01)
*H04B 1/30* (2006.01)
*H04B 17/21* (2015.01)

(52) U.S. Cl.
CPC ............ *H04B 1/16* (2013.01); *H04B 1/30* (2013.01); *H04B 17/21* (2015.01)

(58) Field of Classification Search
CPC ........ G01R 31/31725; G01R 31/31937; H01L 27/0214; H01L 27/0623; H01L 27/0688; H03F 1/0205; H03F 1/523; H03F 2200/102; H03F 2200/294; H03F 2200/451

See application file for complete search history.

(56) References Cited

U.S. PATENT DOCUMENTS

| | | | |
|---|---|---|---|
| 6,919,727 B2* | 7/2005 | Patel | G01R 31/31937 324/535 |
| 7,315,491 B2* | 1/2008 | Takaoka | G11B 7/00718 369/44.26 |
| 2003/0012065 A1* | 1/2003 | Chang | H04L 25/061 365/200 |
| 2014/0266456 A1* | 9/2014 | Vice | H03G 1/0017 330/291 |

* cited by examiner

*Primary Examiner* — Golam Sorowar
(74) *Attorney, Agent, or Firm* — Martensen IP

(57) ABSTRACT

The present invention detects, determines, and mitigates signal-path processing errors. An extracted and inverted reference signal is compared to the carrier signal produced by various functional components to determine the error introduced to that signal by functional components. After the signal has been processed by various signal-processing components, the signal can once again be compared to the inverted reference signal so that a signal-path processing bias can be determined. Using that determination, a signal modification can be initiated to substantially reduce or eliminate all signal-path processing error.

16 Claims, 5 Drawing Sheets

SIGNAL PATH PROCESSING BIAS ERROR DETECTOR

RELATED APPLICATION

The present application relates to and claims the benefit of priority to U.S. Non Provisional patent application Ser. No. 14/602,973 filed 22 Jan. 2015 which claims the benefit of priority to Provisional Patent Application No. 61/930,397 filed 22 Jan. 2014, which is hereby incorporated by reference in its entirety for all purposes as if fully set forth herein.

STATEMENT REGARDING FEDERAL SPONSORED RESEARCH OR DEVELOPMENT

This invention was made with U.S. Government support under contract HQ0147-12-C-7810 awarded by the U.S. Missile Defense Agency. The Government has certain rights to this invention.

BACKGROUND OF THE INVENTION

Field of the Invention

Embodiments of the present invention relate, in general, to bias stability and more particularly, to methods and systems for detecting bias errors in a signal-processing path.

Relevant Background

In engineering, "bias" is the systematic deviation from a reference value. It is a prejudice or an amount by which the average set of values departs from a reference value. It can also be considered to be the predicted difference on average between the measurement and the true value. A closely related topic in engineering is "stability." Stability is the ability of a measuring instrument to retain its calibration over a long period of time. Stability, therefore, determines an instrument's consistency over time. Accordingly, a bias stability is whether a predicted value, different from the true value, is consistent over time. Unfortunately, it is well-known that bias errors in signal path processing are unstable.

To measure the bias, one must take a long sequence of data and find the average value of that data. Then, when the bias value is known, one can determine a bias stability, which is the change in the bias measurement at a different instant in time. For example, what would the bias be if we took data two hours from now? To measure bias stability, we need to measure the bias at many different points in time and see how the bias changes during that time. But even this leaves some question unanswered: for example, how long should we average the data, and how many times should we measure the bias to make a valid measurement of the bias stability, and so on.

These types of errors occur in many systems, including signal processing. Signal processing is an enabling technology that encompasses the fundamental theory, applications, algorithms, and implementations of processing or transferring information contained in many different physical, symbolic, or abstract formats. These formats are broadly designated as signals, and use mathematical, statistical, computational, heuristic, and linguistic representations, formalisms, and techniques for representation, modeling, analysis, synthesis, discovery, recovery, sensing, acquisition, extraction, learning, security, or forensic analysis. Beyond the errors introduced from a sensor of a similar data collection device, the very path through which the signal passes can assert a certain bias to the observed data. Moreover, the bias (or predicted difference) varies between the data's true value and its observed value. That means that the signal processing path bias is not stable. Therefore, a need exists to determine and account for signal processing path bias and changes that may occur to that bias over time. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

One or more embodiments of the present invention detects, determines, and mitigates signal-path processing errors. An extracted and inverted reference signal is compared to the carrier signal produced by various functional components to determine the error introduced to that signal by functional components. After the signal has been processed by various signal-processing components, the signal can once again be compared to the inverted reference signal so that a signal-path processing bias can be determined. Using that determination, a signal modification can be initiated to substantially reduce or eliminate all signal-path processing error.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
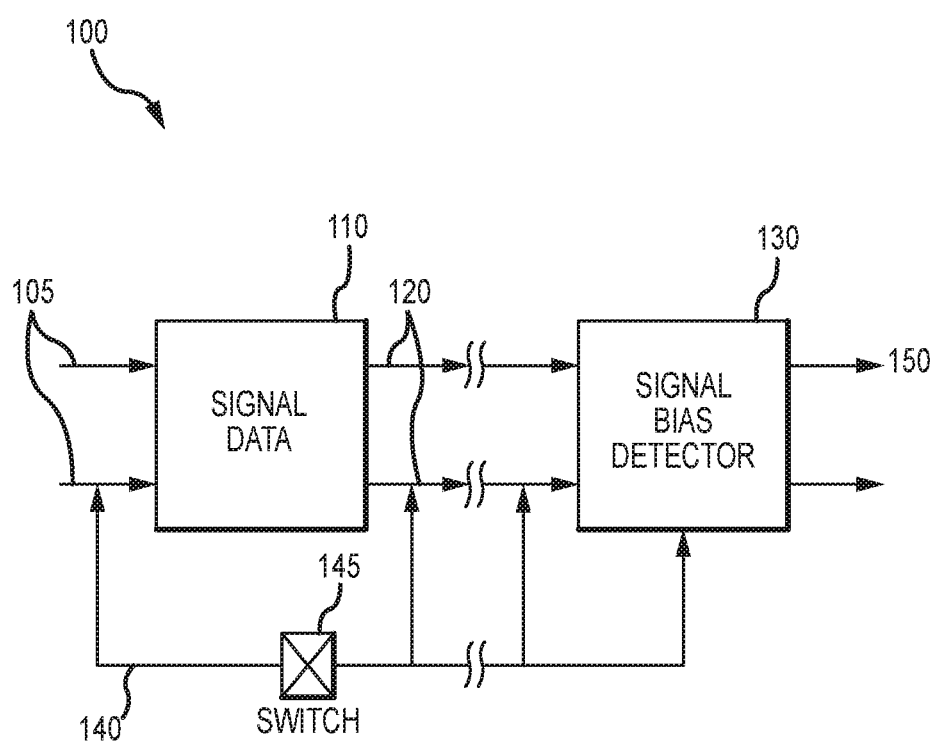
FIG. 1 shows a high-level functional block diagram of a system for detection and correction of signal-path processing bias according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Described below by way of example is a system and associated methodology for detecting bias errors in a signal-processing path. Signal path processing is the most likely source of bias error in time spans that exceed twenty-four hours. It is also the most likely source of error in environments experiencing high thermal gradients ($\partial tT > 2°$ C./s).

Embodiments of the present invention are hereafter described in detail with reference to the accompanying Figures. Although the invention has been described and illustrated with a certain degree of particularity, it is understood that the present disclosure has been made only by way of example and that those skilled in the art can resort to numerous changes in the combination and arrangement of parts without departing from the spirit and scope of the invention.

The following description, with reference to the accompanying drawings, is provided to assist in a comprehensive understanding of exemplary embodiments of the present invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially," it is meant that the recited characteristic, parameter, or value need not be achieved exactly, but that deviations or variations (including for example, tolerances, measurement error, measurement accuracy limitations and other factors known to those of skill in the art) may occur in amounts that do not preclude the effect the characteristic was intended to provide.

Like numbers refer to like elements throughout. In the figures, the sizes of certain lines, layers, components, elements, or features may be exaggerated for clarity.

The terminology used herein is for the purpose of describing particular embodiments only and is not intended to be limiting of the invention. As used herein, the singular forms "a," "an," and "the" are intended to include the plural forms as well, unless the context clearly indicates otherwise. Thus, for example, reference to "a component surface" includes reference to one or more of such surfaces.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements, but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting," "mounted" etc., another element, it can be directly on, attached to, connected to, coupled with, or contacting the other element or intervening elements may also be present. In contrast, when an element is referred to as being, for example, "directly on," "directly attached" to, "directly connected" to, "directly coupled" with, or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper," and the like, may be used herein for ease of description to describe one element or feature's relationship to another element(s) or feature(s) as illustrated in the Figures. It will be understood that the spatially relative terms are intended to encompass different orientations of a device in use or operation in addition to the orientation depicted in the Figures. For example, if a device in the Figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations), and the spatially relative descriptors used herein interpreted accordingly. Similarly, the terms "upwardly," "downwardly," "vertical," "horizontal," and the like are used herein for the purpose of explanation only unless specifically indicated otherwise.

According to one embodiment of the present invention, signal path processing errors can be detected and compensated for by quickly reversing an analog signal relative to material signal variations to identify an offset or bias. FIG. 1 presents a high-level block diagram of a signal path processing bias error detector according to one embodiment of the present invention. As shown, a reference signal 140 is first extracted from the initial input of a signal path 105. Thereafter, it is used by the detector 130 to identify signal path error. One of reasonable skill in the relevant art will recognize that the signal path 110 depicted in FIG. 1 could comprise multiple components as needed for a specific circuit. The concepts of signal-path error detection and compensation presented herein are applicable regardless of the signal path composition. In one embodiment of the present invention, a signal enters 105 a system, a reference signal 140 is taken, and then is reversed by a switch 145. The reserved signal is delivered to a signal bias detector that resides at or near the end of the signal path 110.

The signal 120 that exits from the signal path 110 includes various errors introduced by components within the path. That error can be detected (and thereafter compensated for) by comparing it to the inverse of the signal. In this example, the signal bias detector 130 receives the signal from the signal path 120 and compares it to an inverse of itself (the signal) prior to entering the signal path. If there were no error introduced due to the signal path, the two signals would cancel themselves out. However, any difference between the two can be attributed to the signal path. For example, if the signal entering the signal path 105 is 0.5 volts, the reference signal 140 would be −0.5 volts. If the signal 120 entering the signal bias detector 130 is 0.53 volts, the detector would recognize 0.03 volts as a signal path processing error. In other embodiments of the present invention, the exiting signal 150 can be adjusted back to its original value.

Figure 2:
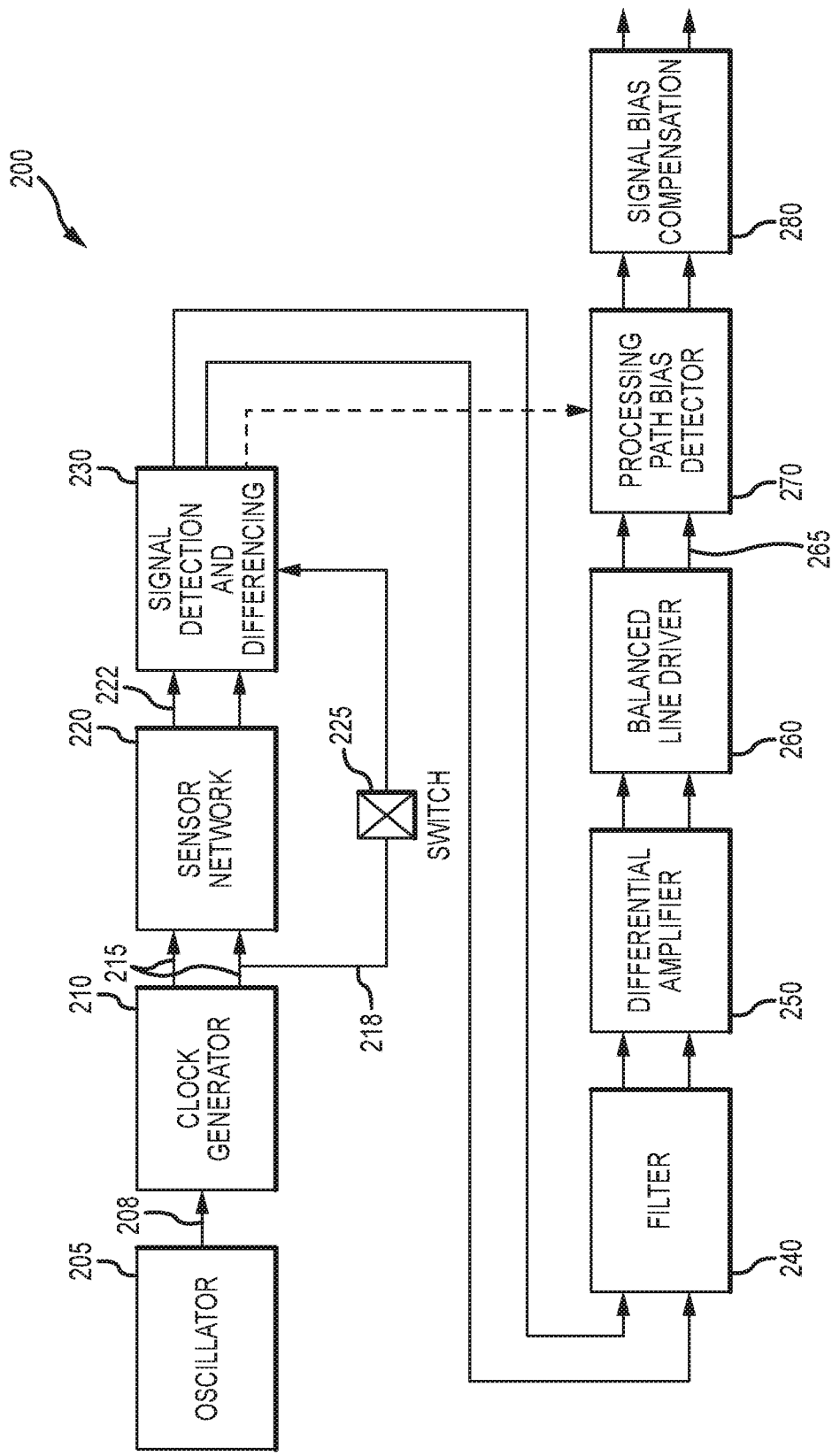
FIG. 2 shows a high-level functional block diagram of a sensor circuit embodying a system for detection and mitigation of signal-path processing error according to one embodiment of the present invention.

FIG. 2 is a high-level block diagram showing what will be recognized by one of reasonable skill in the relevant art as a signal-processing path for differential positional sensor electronics. While the circuit details of various sensor technologies and various components in the signal path may vary, the functional blocks remain essentially the same.

In this example, the signal-processing path 200 begins with an oscillator 205. The resulting signal is then coupled with a clock 210 that, in this case, divides the signal 215. A reference signal 218 is extracted from the signal path 215 and inverted using a switch 225. The original signal 215 then interfaces with a sensor network 220, which is the portion of the signal path 200 that is comprised of the sensor heads (or coils), connecting cables (if any), and one or more passive components. The elimination of errors introduced into the signal path 200 by the sensor network 220 is the subject of additional applications and is beyond the scope of this discussion. Nonetheless, it is important to observe that, in this example, the present invention does not eliminate or compensate for errors introduced by the sensors network, but rather eliminates or compensates additional errors and inaccuracy added to the signal generated by the sensor network 110 from the signal path. In other words, one or more embodiments of the present invention detect cumulative bias errors due to the functional blocks that follow the sensor network 110 within the signal path 100, such as an analog-to-digital convertor and its associated input stages, voltage references, filters, and the like.

Consider, for example, with continued reference to FIG. 2, that one way to measure bias in an accelerometer is to set the accelerometer on a stable table or platform with its measurement axis aligned parallel with the local gravitational vector and note the output signal value. Assume for this example, that the accelerometer identifies an acceleration of 32 f/s/s as indicated by a certain positive voltage value of +0.15 mv. Next, one simply inverts the accelerometer and again notes the output signal value. In this case, the acceleration is −32.1 f/s/s as indicated by −0.155 mv, and is recorded. The bias, in this simple example, is the average of the two readings, or −0.0025 mv. Further assume for this example that −0.0025 mv represents an acceleration of −0.05 f/s/s. The bias of the accelerometer is therefore −0.0025 mv or −0.05 f/s/s. This bias is, however, a combination of sensor bias and bias introduced by the signal-processing path. Assume in this case that the bias error introduced by the sensor is −0.0020 mv, and the error introduced by the signal-processing path is −0.0005 mv. Over time, the output signal values may change, as may their average, or in other words, their bias. Therefore, repeating this experiment at some later times will likely yield a second, third, fourth, etc. bias measurement. Any difference between the results can be referred to as the accelerometer's bias error or bias drift. Once known, this drift can be accounted for so as to provide a better representation of what is actually transpiring. However, what remains uncertain is what portion of the error is attributed to the sensor itself or the signal path.

The type of a calibration presented above is not practical outside the laboratory or after the accelerometer is installed in an Inertial Measurement Unit (IMU). In accordance with one embodiment of the present invention, a very similar test can be performed on electronic systems without altering the physical condition of a sensor, and can isolate the error due to the signal path. A bias determination process can effectively occur by inverting the signal shown connecting the sensor network block 220 in FIG. 2 with the signal detection and differencing block 230.

By accomplishing this reversal very quickly relative to the motion of the inertial mass in the accelerometer of the sensor network 220, the net result is exactly the same as with the physical laboratory calibration test, but further isolates bias error due to signal-processing from that of the sensor networks. Since the reversal of the signals is quick, the error introduced by the sensor network remains constant. Therefore, any bias identified by the methodology of the present invention is isolated by the passive components associated with signal processing. Furthermore, this test can be performed at any time and with the accelerometer in any position. Signals from other types of sensors can also be reversed in the same manner to identify signal-processing path bias.

Consider the following example: the oscillator 205 generates a signal 208 that is thereafter divided 215. Assume that the divided signal post clock 210 has a value of 0.5 mv. A reference signal 218 of 0.5 mv is extracted from the path and inverted by a switch 225. The original signal 215 is also supplied to the sensor network. The sensor network produces data embedded in the signal 222 having a value of 0.52 mv. A signal detection and difference component 230 recognizes that the differences between the post sensor network signal 222 and the extracted reference signal 218 are errors attributed to the sensor network. In this case, the error introduced to signal by the sensor network is 0.02 mv.

The signal is then filtered by a low bypass filter 240, amplified by a differential amplifier 250, and balanced by a line driver 260. One of reasonable skill in the relevant art will recognize that the additional components shown in the signal path of FIG. 2 are for illustrative purposes only and that additional or different components can be added or subtracted from the processing path without departing from the scope of the present invention.

As the signal transcends the various components, error attributed to the signal path is introduced to the signal. In this example, assume that the signal 265 exiting from the balanced line driver 260 is 0.55 mv. The signal-path processing bias detector 270 compares the signal 265 received from balanced line driver 260 with that of the inverted reference signal 218 and the post sensor network signal 222. Since the value of the signal after the sensor network 220 was 0.52 mv, and 0.02 mv was introduced by sensor network error, the signal-path processing bias detector 270 can determine that an additional 0.03 mv of error was introduced to the signal path by components after the sensor network 220. In this example, the filter 240, differential amplifier 250, and balanced line driver introduced an additional 0.3 mv of error into the signal.

In another embodiment of the present invention, additional comparisons can be conducted, if necessary, to identify the extent of error introduced to the signal-processing path by each component. For example, using the same technique, the present invention can identify that of the 0.03 mv of error introduced by the filter 240, differential amplifier 250, and balanced line driver 260, 0.01 mv was introduced by the filter 240, 0.0025 was introduced by the differential amplifier 250, and 0.0175 was introduced by the balanced line driver 260. And as one or reasonable skill in the relevant art will recognize, the same approach can be scaled to encompass other components or blocks of components.

Once the signal-processing path bias has been detected, an adjustment or compensation can be added to the signal to effectively reduce or eliminate all signal-processing path error. Using the example above, a signal bias compensator 280 can modify the signal 265 by adding −0.03 mv. The resulting signal will be 0.052, which is identical to the signal 222, leaving the sensor network 220 with the added processing features of the filter 240, differential amplifier 250, and balanced line driver 260. Thus, the signal-processing path error has been detected and eliminated.

In one version of the present invention, the process of signal path processing bias detection and compensation is accomplished with detection schemes using synchronous demodulators such as Gilbert cells and its derivatives. It can also be accomplished, in a different embodiment, with phase detection circuits.

By analogy, and in an over-simplification for illustrative purposes, the present invention is similar to measuring the voltage on your car battery with a hand-held voltmeter and swapping the leads. If the average reading is not exactly zero, then your voltmeter must have an offset error (bias).

With respect to the use of the present invention in systems that include an accelerometer, the bias test of the present invention can be performed in less than 40 μs with 20+ bits of digital precision. In an operational environment with highly dynamic accelerations, it may be necessary to average several readings to achieve useful data. By doing so, not only can the signal-processing path bias be accurately determined and compensated, but also the dynamic nature of the bias (drift) can be understood. Thus, errors (bias) introduced by the signal-processing path can be identified and accommodated to reduce or eliminate any signal path processing bias errors.

Figure 3:
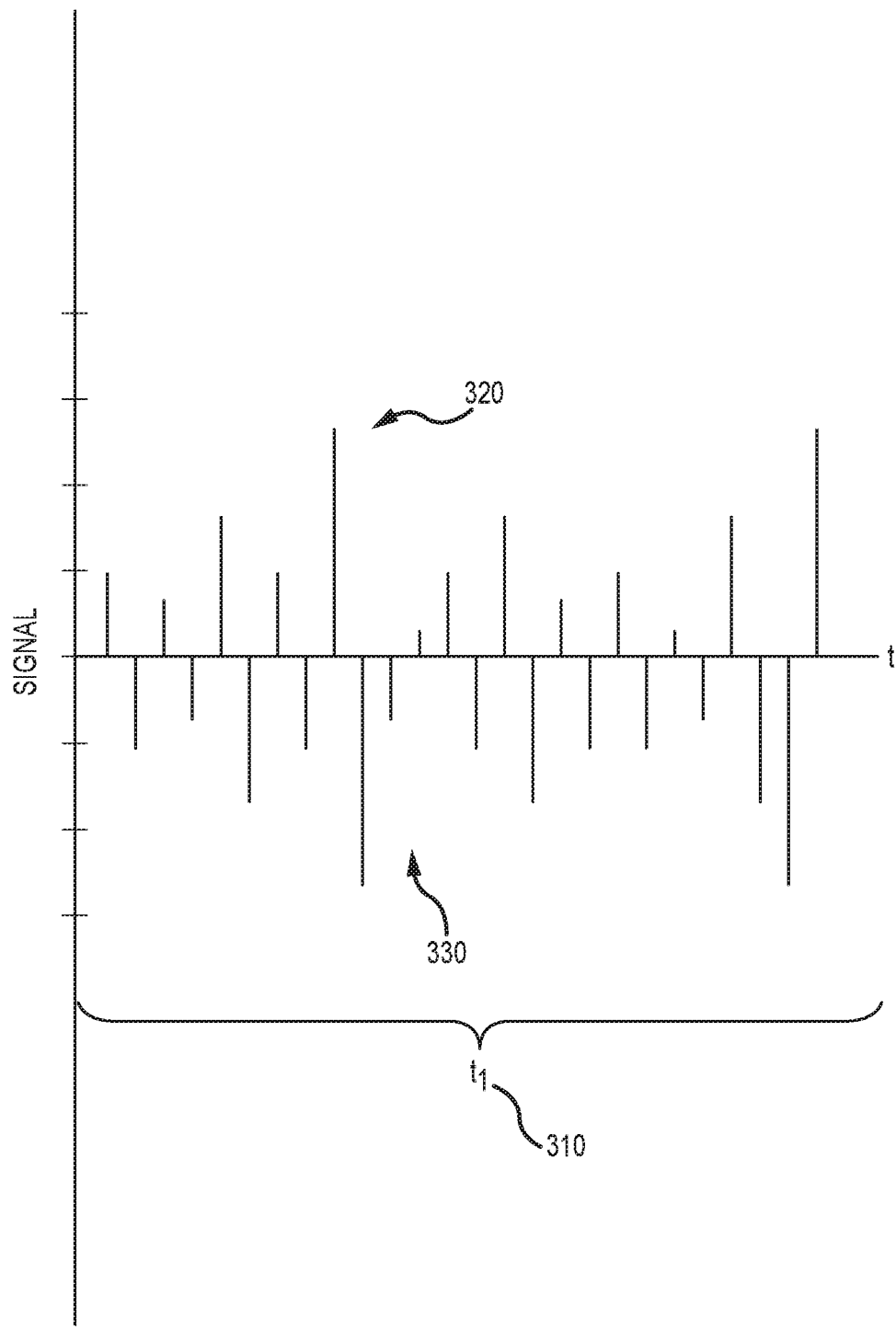
FIG. 3 is a graphical representation of a comparison between a carrier signal and its inverse used to detect signal-path processing error according to one embodiment of the present invention.

"Drift" is an inconsistency in bias. FIG. 3 shows a graphical illustration of variances in data found in the signals detected by the signal detection and differencing component 230. Over time, the differences in the original signal and that of the reference signal may vary. During a period of time, $t_1$ 310, each signal received 320 is compared to its inverse 330. That value, as discussed above, identifies the error introduced into the signal by the sensor network and the signal path. In the example above, assume that sampling over time ($t_1$) has determined that the error attributed to the sensor network is 0.2 mv and 0.3 mv for the signal path.

Figure 4:
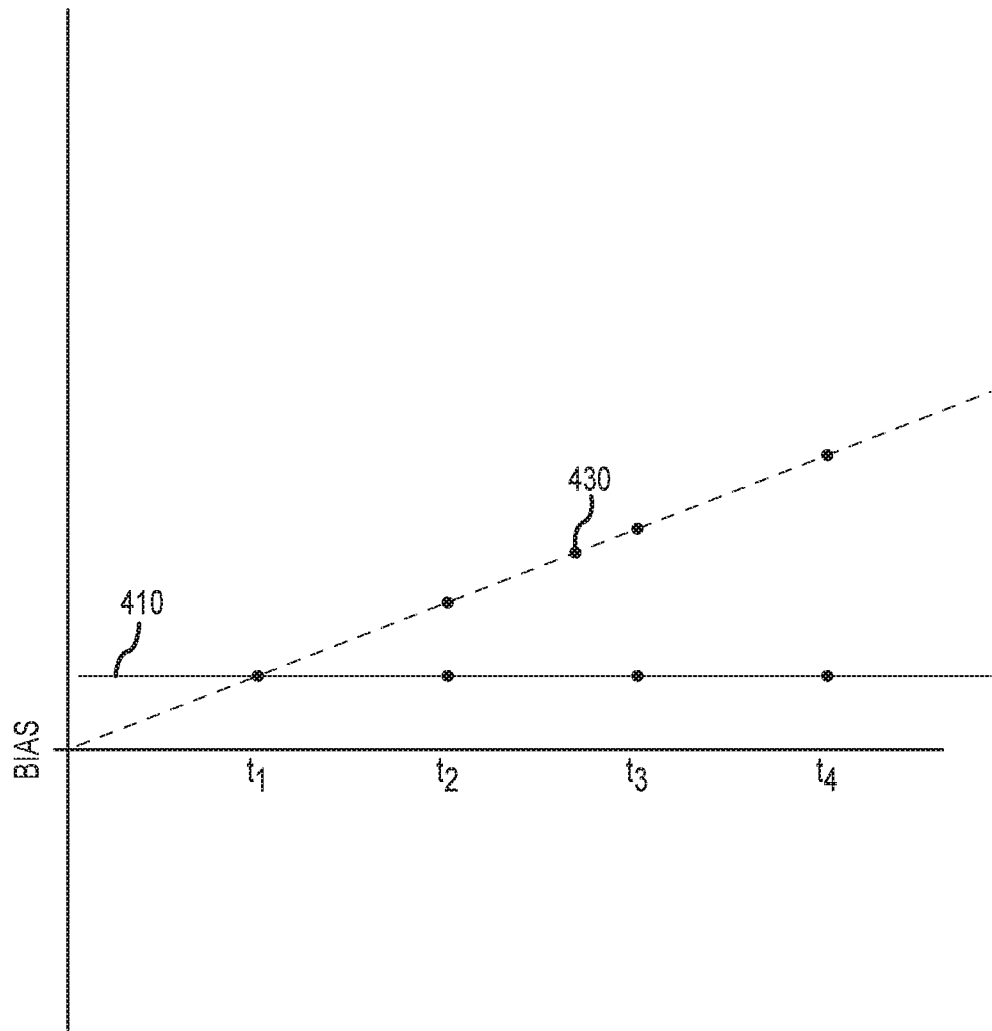
FIG. 4 is a graphical representation of change, over a period of time, of signal-path processing error as compared to error introduced by a functional component, according to one embodiment of the present invention.

By sampling the errors over various time intervals, an appreciation for the signal-path processing and, in this example, sensor network error drift can be observed. FIG. 4 presents a graphical illustration of errors identified by the present invention over a period of time. In this illustration, sensor network error 430 and signal-path processing error 410 are graphed over a period of four time intervals. The illustration of FIG. 4 identifies that the error due to signal-path processing is substantially constant while the sensor network error appears to be increasing at a linear rate. Using information such as this, an error mitigation protocol can be developed, as can decision points for recalibration, part replacement, or periods of useful life.

Figure 5:
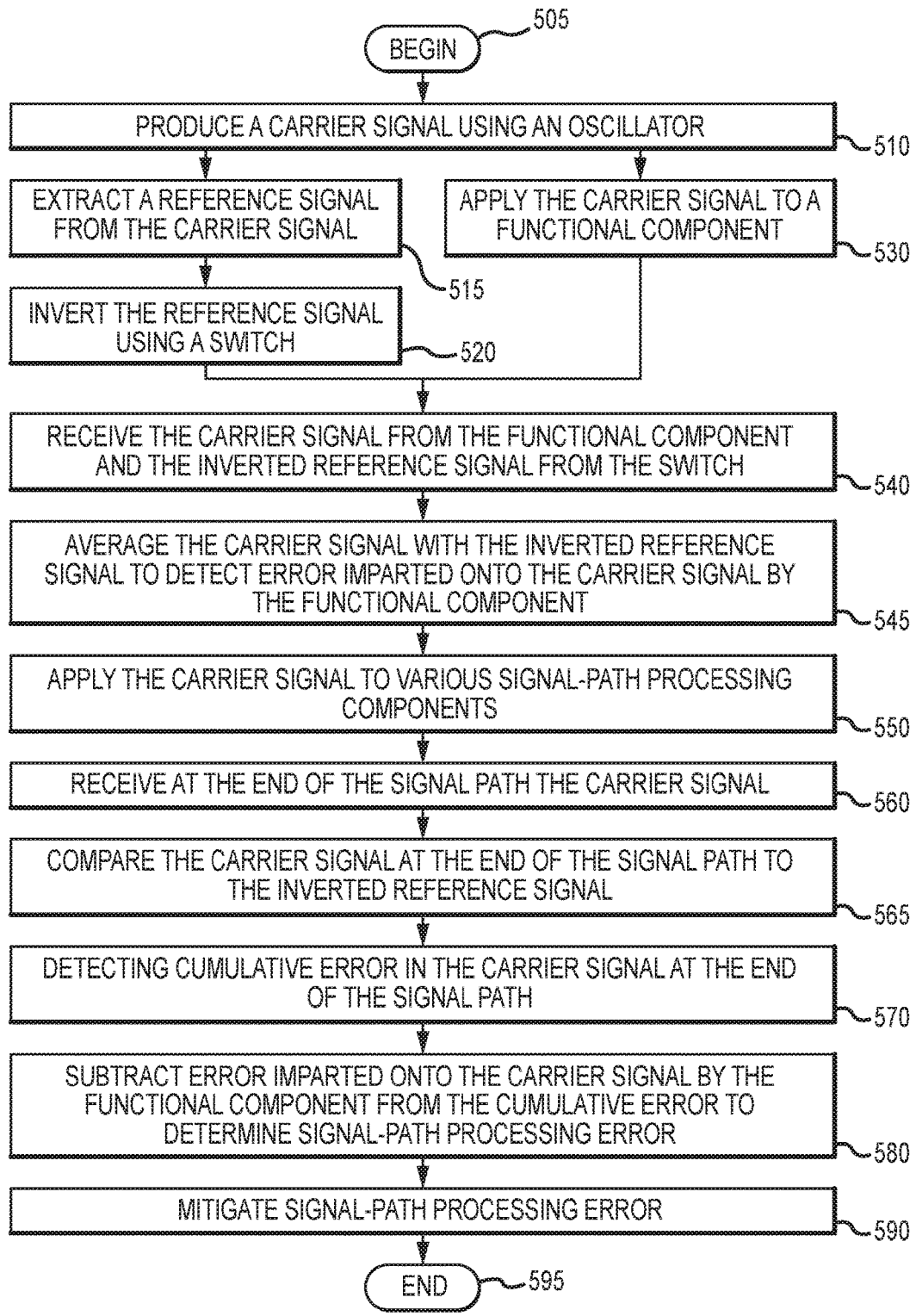
FIG. 5 is a flowchart of one methodology for detecting and mitigation signal-path processing error according to one embodiment of the present invention.

FIG. 5 presents a flowchart depicting an example of a methodology that may be used to detect and mitigate signal-path processing error. In the following description, it will be understood that each block of the flowchart illustrations, and combinations of blocks in the flowchart illustrations, can be implemented by, in part or in association with, computer program instructions. These computer program instructions may be loaded onto a computer or other programmable apparatus to produce a machine such that the instructions execute on the computer or other programmable apparatus creating a means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

The methodology shown in FIG. 5 begins 505 with the production or generation of a carrier signal 510. In one embodiment of the present invention, an oscillator creates a signal that can then be divided by a clock. From that carrier signal, a reference signal is extracted 515 and then inverted 520 using a switch or similar device. Concurrently, the carrier signal is utilized 530 by one or more functional components. A functional component can be a sensor network or the like which can use the carrier signal as a means to embed useful data.

Thereafter, the carrier signal and the inverted reference signal are received 540, in one embodiment, by a signal detection and differencing component. The carrier signal and the inverted reference signal are averaged 545 to arrive at a determination of the error imparted onto the carrier signal by the functional component(s).

The carrier signal is processed along a signal-path 550 to modify, convert, and enhance the signal. In one embodiment of the present invention, components such as filters, amplifiers, and drivers modify the signal to achieve a desired result. The carrier signal is received 560 at the end of the signal path by a bias detector that once again compares the carrier signal to the inverted reference signal to determine 570 a cumulative error imparted onto the carrier wave since its generation.

Knowing the cumulative error, the signal-path processing error imparted onto the carrier signal by the signal-path processing components is determined 580 by subtracting the functional component error from the cumulative error. With the signal-path processing error (bias) determined, signal-path processing error mitigation 590 can occur to remove any error introduced to the carrier signal by the signal-path components 595, ending the process.

One or more embodiments of the present invention detect, determine, and mitigate signal-path processing errors. By comparing an extracted and inverted reference signal to the carrier signal produced by various functional components, the error introduced to that signal can be understood. After the signal has been processed by various signal components, the signal can once again be compared to the inverted reference signal so that a signal-path processing bias can be determined. Using that determination, a modification to signal can be initiated to substantially reduce or eliminate all signal-path processing error.

While the principles of the present invention in conjunction with a determination and mitigation of signal-path processing bias have been described above, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se, and which may be used instead of or in addition to features already described herein. Although claims have been formulated in this application to particular combinations of features, it should be understood that the scope of the disclosure herein also includes any novel feature or any novel combination of features disclosed either explicitly or implicitly, or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A method for determining signal-path processing bias, comprising:
    receiving, at one or more functional components of a signal-path processing bias detection circuit, a first carrier signal wherein the first carrier signal includes a reference signal and wherein the one or more functional components adds a component error to the first carrier signal forming a second carrier signal;
    averaging an inversion of the reference signal with the second carrier signal to identify the component error;
    processing the second carrier signal by one or more signal-processing components and wherein the one or more signal processing components adds a signal processing error to the second carrier signal forming a third carrier signal;
    determining a signal-path processing bias by averaging the third carrier signal with the inversion of the reference signal and thereafter subtracting the component error.

2. The method for detecting signal-path processing bias according to claim 1, wherein the component error is sensor network error.

3. The method for detecting signal-path processing bias according to claim 1, wherein the inversion of the reference signal is accomplished by a switch.

4. The method for detecting signal-path processing bias according to claim 1, further comprising compensating the third carrier signal based on the signal-path processing bias.

5. The method for detecting signal-path processing bias according to claim 1, further comprising monitoring the signal-path processing bias over a time interval to determine a rate of change of the signal-path processing bias.

6. The method for detecting signal-path processing bias according to claim 5, further comprising mitigating signal-path processing bias at a predetermined time.

7. The method for detecting signal-path processing bias according to claim 5, further comprising mitigating signal-path processing bias at predetermined time intervals.

8. A system for signal-path processing error detection, comprising
    a first carrier signal;
    a reference signal associated with the first carrier signal;
    one or more functional components, wherein the one or more functional components receives the first carrier signal and a component error is added by the one or more functional components to the first carrier signal forming a second carrier signal;
    a signal inversion component wherein the signal inversion components receives the reference signal to form an inverted reference signal;
    a signal detection and differencing component coupled to the signal inversion component and the one or more functional components wherein the signal and differencing component average the second carrier signal with the inverted reference signal to identify the component error;
    one or more signal-path processing components coupled to the signal detection and differencing component wherein the one or more signal-path processing components receives the second carrier signal and a signal path processor error is added by the one or more signal-path processing components to the second carrier signal forming a third carrier signal; and
    a signal-path bias detector coupled to the one or more signal-path processing components, the signal inversion component and the signal detection and differencing component to identify a signal-path bias by averaging the third carrier signal with the inverted reference signal and thereafter subtracting the component error.

9. The system for signal-path processing error detection according to claim 8, wherein the first carrier signal is generated by a oscillator.

10. The system for signal-path processing error detection according to claim 8, wherein the one or more functional components are one or more sensors.

11. The system for signal-path processing error detection according to claim 8, wherein the signal inversion component is a switch.

12. The system for signal-path processing error detection according to claim 8, wherein the signal inversion component is an inverting amplifier.

13. The system for signal-path processing error detection according to claim 8, wherein the signal inversion component shifts phase of the signal 180 degrees.

14. The system for signal-path processing error detection according to claim 8, wherein the signal-path processing components includes a filter.

15. The system for signal-path processing error detection according to claim 8, wherein the signal-path processing components includes an amplifier.

16. The system for signal-path processing error detection according to claim 8, wherein the signal-path processing component includes a balanced line driver.

* * * * *